United States Patent [19]
Ghisolfi et al.

[11] Patent Number: 5,547,652
[45] Date of Patent: Aug. 20, 1996

[54] PROCESS FOR THE PURIFICATION OF INERT GASES

[75] Inventors: Guido Ghisolfi; Dario Giordano; Giuseppina Boveri, all of Tortona, Italy

[73] Assignee: Sinco Engineering S.p.A., Italy

[21] Appl. No.: 397,209

[22] PCT Filed: Nov. 8, 1993

[86] PCT No.: PCT/EP93/03117

§ 371 Date: Mar. 10, 1995

§ 102(e) Date: Mar. 10, 1995

[87] PCT Pub. No.: WO95/24461

PCT Pub. Date: Jan. 26, 1995

[30] Foreign Application Priority Data

Jul. 16, 1993 [IT] Italy .................................. MI93A1576

[51] Int. Cl.$^6$ ........................................................ B01J 8/00
[52] U.S. Cl. ...................... 423/245.3; 423/351; 528/272; 528/274
[58] Field of Search .............................. 423/245.3, 351; 528/272, 274

[56] References Cited

U.S. PATENT DOCUMENTS

| | | | |
|---|---|---|---|
| 2,756,121 | 7/1956 | Grimes | 423/245.3 |
| 4,919,903 | 4/1990 | Gandhi et al. | 423/245.3 |

FOREIGN PATENT DOCUMENTS

| | | |
|---|---|---|
| 0197717 | 10/1986 | European Pat. Off. . |
| 0222714 | 5/1987 | European Pat. Off. . |
| 3424532 | 1/1986 | Germany . |
| 3527175 | 2/1987 | Germany . |
| 3628572 | 3/1988 | Germany . |
| 60369 | 5/1978 | Japan ................................. 423/245.3 |
| 130534 | 8/1982 | Japan ................................. 423/245.3 |
| 187323 | 9/1985 | Japan ................................. 423/245.3 |
| 262311 | 10/1989 | Japan ................................. 423/245.3 |
| 363138 | 12/1992 | Japan ................................. 423/245.3 |
| 592436 | 2/1978 | U.S.S.R. ............................. 423/245.3 |

OTHER PUBLICATIONS

Database WPI, Section Ch, Week 8711, Derwent Publications, Inc. (London, GB), AN 87–073107 & DD,A,240 672 (VEB Leuna–Werk Ulbricht).

*Primary Examiner*—Wayne Langel
*Attorney, Agent, or Firm*—Edward D. Manzo; Ted K. Ringsred; Mark J. Murphy

[57] ABSTRACT

Process for the purification of inert gases containing impurities of organic nature particularly of gas (nitrogen) coming from solid state polycondensation reactors or polyester resins including the gas treatment with the stoichiometric quantity (or slightly higher) of oxygen as regards the present impurities at a temperature between 250° and 600° C. by using Pt or Pt/Pd catalysts supported on a porous solid and the gas recycling directly to the polycondensation reactor before drying to eliminate the water produced during the reaction of impurities oxidation.

16 Claims, No Drawings

PROCESS FOR THE PURIFICATION OF INERT GASES

The present invention refers to a process for the purification of an inert gas containing impurities formed of organic compounds.

The invention relates particularly to a process for the purification of an inert gas coming from solid state polycondensation SSP reactors of polyester resins.

The impurities present in the inert gas streams (nitrogen) used as cleaning gas in the SSP reactors are generally formed of aldehydes and glycols (acetaldehyde and ethyleneglycol in the case of polyethyleneterephthalate) and glycol oligomers.

These impurities are stripped from polymer chips and accumulate in the inert gas stream. They are present in the gas to be purified, in quantities, defined as methane equivalent, up to about 2000–3000 ppm or more.

The method so far used for the purification of inert gases coming from SSP reactors includes:

a $CO_2$ oxidation stage of the impurities;

a deoxidation stage with hydrogen in order to eliminate the oxygen used in the first stage;

a drying-process stage of the gaseous stream in order to eliminate the water formed in the previous stages.

The oxidation stage is carried out with oxygen or with gas containing oxygen (generally air) by using an oxygen excess on the stoichiometric quantity as regards the impurities.

The oxidation stage performance is controlled so that the gaseous stream at the outlet contains an oxygen excess of 50–500 ppm.

The reaction is generally carried out at a temperature between 500° C. and 600° C. by circulating the gaseous stream on a catalyst bed formed of a support coated with platinum or platinum/palladium.

The high oxygen content present in the gaseous stream coming out of the oxidation section does not allow to recycle the same to the SSP reactor, previous drying-process, due to the possible oxidation reactions and/or polymer degradation.

It is necessary a deoxidation treatment with hydrogen in order to eliminate the present oxygen. The performance of the deoxidation section is monitored by controlling the stream hydrogen excess at the outlet and the oxygen content.

The last stage is a drying-treatment carried out by circulating the gas on a silica gel, molecular sieves or other beds of drying materials. In this stage the water stripped from polymer chips and generated in the oxidation and deoxidation stages, is eliminated.

After this stage the gas is recycled to the SSP reactor. It has been unexpectedly found, that it is possible to purify with satisfactory results the stream of an inert gas coming out of a SSP reactor, even using the stoichiometric quantity of oxygen necessary to the oxidation (combustion) of the impurities or a quantity slightly higher than the stoichiometric one, not so high however to have oxygen concentrations higher than about 10 ppm in the gas coming out of the reactor.

The thus purified gas is directly recycled to the SSP reactor, previous a drying-treatment, omitting in this way the deoxidation stage with hydrogen.

The possible oxygen traces present in the recycled gas do not cause oxidative effects and/or polymer degradation. Even if the invention process operates with the oxygen stoichiometric quantity or little higher, it allows to reduce the impurities to acceptable values, less than 10 ppm (defined as methane equivalent).

To realize the purification process in continuous it is necessary the stoichiometry continuous control of the oxidation reaction; it is necessary to monitor the oxygen quantity present in the gaseous stream at the outlet of the oxidation reactor with devices able to detect the $O_2$ (10 ppm or less) with very short answer times (less than a few second), sampling included.

It has been found, and this is another aspect of the invention, that the zirconia sensors for oxygen are analysers suitable for working the invention process.

These sensors include a ceramic material made of zirconia doped with yttrium that, when it is heated at a temperature higher than 620° C., is converted into electrolytic conductor for the oxygen ions and it is able to function as oxygen concentration cell.

The sensor is generally formed of a probe with porous platinum coating on the internal and external surface. Air or a gas with known oxygen concentration, which is used as reference gas, circulates outside the tube; on the inside the gas sample to be analyzed is circulated.

A stream of oxygen ions tends to migrate from the sensor external surface to the internal one; in equilibrium condition a potential difference among Pt electrodes is settled, which depends on the different oxygen concentration in the gases inside and outside the sensor.

These sensors allow answer times even lower than about 5 sec. Zirconia analysers are known in the literature and are available commercially. Producers of zirconia sensors are Panametrics, Rosemounts, Hartman & Brown Westinghouse, Systech.

In addition to the above-mentioned sensors, it is possible to use any other oxygen sensor, even if it operates with different principles, provided that it is able to detect oxygen quantities at ppm level with analysis times less than about 5 sec.

The oxidation temperature is comprised between 250° C. and 600° C. and depends mainly on the type of catalyst used.

The catalyst consists of platinum or platinum-palladium placed on an inert support.

Examples of utilizable supports are gamma alumina and silica.

It has been found, and this is another aspect of the invention, that the temperature can be lowered between 250° C. and 350° C. in comparison with 500° C.–600° C. necessary in the processes of the prior art, using a Pt-Pd catalyst supported on a special type of gamma alumina having a surface area higher than 70–80 $m^2/g$, a bulk density of 0.6–0.7 $g/cm^3$, a porosity of 0.5–0.6 $cm^3/g$, and particles size of 2–4 mm. The Pt and Pd content is respectively of about 1,5% by weight.

Catalysts containing only Pt (1–2% by weight) supported on gamma alumina can be also used.

The Pt or Pt-Pd oxidation catalysts usable in the invention process are of known type.

Catalysts sold with the trade-mark F 257 Id/D-IPAD 115/100 DA1; E 257 Id/d-IPAD 215/100 DB1; EF 2038 Id/D-IPAD 115/215 100 D/H by DEGUSSA and with trademark K 0144-IPAD 11/60 I1/A and KO 240-IPAD 25/60 Id/B by HERAEUS can be found on the market.

A detailed description of a preferred method of carrying out the process is the following.

The gas (generally nitrogen) coming from the SSP reactor is at a temperature between about 200° and 240° C.

At first it is filtered and air is injected in such a quantity to guarantee the complete combustion of the present impurities, tolerating a max. excess of about 10 ppm of oxygen at the reactor outlet.

The air/nitrogen mixture is heated to a temperature of 250°–350° C. and the oxidation reactor, where the impurities combustion is obtained by circulating the stream on a catalyst bed including Pt or Pt-Pd.

The gaseous stream circulates then to an exchanger for the heat recovery and then it is sent to a second stage operating at 200° C.

The gaseous stream at the reactor outlet contains only nitrogen, carbon dioxide and water.

The carbon dioxide content stabilizes at a certain level due to the loss through the whole SSP plant and acts like an inert gas, thanks to its chemical inertia.

The water is eliminated by cooling at first the gaseous stream at about 10°–15° C. with a double-effect heat exchanger.

A part of the stream condenses and is eliminated; the stream goes into a molecular sieves dryer from where it is recycled to the SSP reactor, after having been filtered from the eventual particle traces of molecular sieves.

The regeneration of the molecular sieves bed is performed in conformity with known methods, operating for example on a closed circuit with a warm nitrogen stream.

The polyester resins usable in the SSP process are products of polycondensation of aromatic bicarboxylic acid, particularly terephthalic acid or its esters with diols with 1–12 carbon atoms such as ethylene glycol, 14-dimethylolcyclohexane, 1,4-butandiol. The polyethyleneterephthalate and the polybutyleneterephthalate are the preferred resins. The elastomeric polyester resins, including segments deriving from polyethylenic glycol, are included in the definition of polyester resins.

The copolyesters containing units up to 20%, deriving from bicarboxylic acids different from terephthalic acid, such as isophthalic acid are also included.

The resins to be subjected to SSP can contain a resin upgrading additive, i.e. able to accelerate the polycondensation reaction and/or the solid state polycondensation reaction.

The preferred upgrading agents are the dianhydrides of tetracarboxylic aromatic acids.

Pyromellitic dianhydride is the preferred compound.

The upgrading agent is generally used in a quantity of about 0.05–2% by weight.

Conventional additives, like stabilizers, dyes, flame retardant, nucleants can be present in the resin.

The invention process can be applied not only to the inert gas purification coming from a SSP reactor, but also to the inert gas purification containing impurities of any type of organic nature, provided that they are oxidable to $CO_2$ and water under the process conditions.

The following example is given to illustrate and not to limit the invention.

EXAMPLE 1

Table 1 shows the flows of the different circulating streams in a plant for nitrogen purification coming from a reactor for solid state polycondensation of polyethyleneterephthalate having a capacity of 68 t/d.

Number 1 indicates the nitrogen stream to be purified, number 2 the stream after the oxidation stage, number 3 the air stream injected into the nitrogen stream, number 4 the purificated gas stream.

The oxygen quantity used in the oxidation stage is such as to have less than 5 ppm of oxygen in the gaseous stream at the outlet of the reactor.

The mixture air/nitrogen is heated to a temperature of about 300° before being sent to the oxidation reactor, where it is circulated on a bed of catalyst particles formed of Pt (1,5% by weight) and Pd (1,5% by weight) supported on gamma alumina having a surface area of 100 $m^2/g$ and a porosity of 0.54 cmc/g. (Catalyst EF2038Id/D IPAD 115/215 100 PH produced by HERAEUS).

TABLE 1

| Components | Gaseous Stream | | | |
| --- | --- | --- | --- | --- |
|  | 1 | 2 | 3 | 4 |
| Water Kg/h | 9.5 | 4.66 |  | <5 ppm |
| nitrogen Kg/h | 2430 | 2443 | 13.4 | 2443 |
| acetaldehyde Kg/h | 0.3 |  |  |  |
| ethylene glycol Kg/h | 2.1 |  |  |  |
| total hydrocarbons |  |  |  |  |
| kg/h | 2.5 | <10 ppm |  | <10 ppm |
| oxygen Kg/h | traces | <5 ppm | 3.6 | <5 ppm |
| $CO_2$ Kg/h | 65 | 68.7 |  | 68.7 |

We claim:

1. Process for the purification from impurities formed of organic compounds of a recycle inert gas stream leaving a solid-state polycondensation reactor of polyester resins comprising adding oxygen or gas containing oxygen to the gas stream, circulating the gas stream on a catalytic bed containing Pt or mixtures of Pt and Pd supported on an inert porous support at temperatures from 250° to 600° C., characterized in that the quantity of oxygen used is stoichiometric with respect to the organic impurities or in such an excess that the gas at the outlet of the oxidation reactor contains up to 10 ppm of oxygen and in that the gaseous stream leaving the oxidation reactor is recycled to the solid-state polycondensation reactor after a drying treatment to remove water present.

2. Process according to claim 1, where stoichiometry of the oxidation reaction is monitored by connecting at the outlet of the catalytic bed an oxygen analyzer suitable to detect oxygen ppm with analysis answer times less than 5 sec.

3. Process according to claim 1, wherein the gaseous stream comes from a solid-state polycondensation reactor of a polyester resin selected from the group consisting of polyethyleneterephthalate, polybutyleneterepthalate and polyethyleneterepthalate copolymers containing units from bicarboxylic aromatic acids in amount up to 20% by mols.

4. Process according to claim 2, wherein the gaseous stream comes from a solid-state polycondensation reactor of a polyester resin selected among polyethyleneterephthalate, polybutyleneterephthalate and polyethyleneterepthalate copolymers containing units from bicarboxylic aromatic acids in amount up to 20% by mols.

5. Process according to claim 3 where the inert gas is nitrogen or includes nitrogen.

6. Process according to claim 2 where the catalyst is formed of Pt and Pd supported on gamma alumina having a porosity of 0.4–0.6 cmc/g.

7. Process according to claim 3 where the catalyst is formed of Pt and Pd supported on gamma alumina having a porosity of 0.4–0.6 cmc/g.

8. Process according to claim 5 where the catalyst is formed of Pt and Pd supported on gamma alumina having a porosity of 0.4–0.6 cmc/g.

9. Process according to claim 6, where the catalytic bed temperature is kept between 250° and 350° C.

10. Process according to claim 5 where the analyzer is a zirconia sensor for oxygen.

11. Process according to claim 6 where the analyzer is a zirconia sensor for oxygen.

12. Process according to claim 9, wherein the analyzer is a zirconia sensor for oxygen.

13. Process according to claim 2 where air is used a gas containing oxygen.

14. Process according to claim 3, wherein air is used as gas containing oxygen.

15. Process according to claim 5, wherein air is used as gas containing oxygen.

16. Process according to claim 9, wherein air is used as gas containing oxygen.

* * * * *